US012056372B2

(12) United States Patent
Lee et al.

(10) Patent No.: US 12,056,372 B2
(45) Date of Patent: Aug. 6, 2024

(54) COLLECTING QUALITY OF SERVICE STATISTICS FOR IN-USE CHILD PHYSICAL FUNCTIONS OF MULTIPLE PHYSICAL FUNCTION NON-VOLATILE MEMORY DEVICES

(71) Applicant: MICROSOFT TECHNOLOGY LICENSING, LLC, Redmond, WA (US)

(72) Inventors: Scott Chao-Chueh Lee, Bellevue, WA (US); Lei Kou, Redmond, WA (US); Monish Shantilal Shah, Sammamish, WA (US); Brenda Wai Yan Bell, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 128 days.

(21) Appl. No.: 17/588,204

(22) Filed: Jan. 28, 2022

(65) Prior Publication Data

US 2023/0244390 A1    Aug. 3, 2023

(51) Int. Cl.
*G06F 3/00* (2006.01)
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 2013/0297907 | A1* | 11/2013 | Ki | .......... | G06F 3/0679 |
|  |  |  |  |  | 711/170 |
| 2021/0132860 | A1* | 5/2021 | Kou | ...... | G06F 3/0659 |
| 2021/0255971 | A1 | 8/2021 | Kim et al. |  |  |
| 2021/0342245 | A1* | 11/2021 | Doddaiah | ........... | G06F 11/3409 |

OTHER PUBLICATIONS

"Solid State Storage", in Advancing Storage and Information Technology, Oct. 1, 2020, 101 Pages.

(Continued)

*Primary Examiner* — Midys Rojas
(74) *Attorney, Agent, or Firm* — Newport IP, LLC; Jacob P. Rohwer

(57) ABSTRACT

The disclosed technologies provide functionality for collecting quality of service ("QoS") statistics for in-use child physical functions of multiple physical function ("PF") non-volatile memory devices ("MFNDs"). A host computing device creates a child PF on a MFND and configures the child PF on the MFND to provide a specified QoS level to an associated VM executing on the host computing device. The MFND then collects child PF QoS statistics for the child PF that describe the utilization of resources provided by child PF to an assigned VM. The MFND provides the child PF QoS statistics from the MFND to the host computing device. The collected child PF QoS statistics can be utilized to inform decisions regarding reallocation of MFND-provided resources, provisioning of new MFND-provided resources, and for other purposes.

19 Claims, 11 Drawing Sheets

SWAP CHILD PHYSICAL FUNCTION QOS STATISTICS ACTIVE AND SAVE LOGS

(56) References Cited

OTHER PUBLICATIONS

"TCG Storage Architecture Core Specification", https://trustedcomputinggroup.org/wp-content/uploads/TCG_Storage_Architecture_Core_Spec_v2.01_r1.00.pdf, Aug. 5, 2015, 306 Pages.

"TCG Storage Feature Set: Block SID Authentication", Retrieved from: https://trustedcomputinggroup.org/wp-content/uploads/TCG_Storage-Feature_Set_Block_SID_Authentication_1-00_1-00.pdf, Aug. 5, 2015, 12 Pages.

"TCG Storage Interface Interactions Specification (SIIS)", Retrieved from: https://trustedcomputinggroup.org/wp-content/uploads/TCG_SWG_SIIS_v1.08_r1.00.pdf, Oct. 26, 2018, 58 Pages.

"TCG Storage Opal SSC Feature Set: Additional DataStore Tables", Retrieved from: https://web.archive.org/web/20210126214916/https://trustedcomputinggroup.org/resource/tcg-storage-opal-ssc-feature-set-additional-datastore-tables/, Jan. 26, 2021, 5 Pages.

"TCG Storage Opal SSC Feature Set: Configurable Namespace Locking", Retrieved from: https://trustedcomputinggroup.org/wp-content/uploads/TCG_Storage-Opal_Feature_Set_CNL_v1_00_r1_00_pub.pdf, Feb. 22, 2019, 41 Pages.

"TCG Storage Opal SSC Feature Set: PSID", Retrieved from: https://trustedcomputinggroup.org/wp-content/uploads/TCG_Storage-Opal_Feature_Set_PSID_v1.00_r1.00.pdf, Aug. 5, 2015, 13 Pages.

"TCG Storage Opal SSC Feature Set: Single User Mode", Retrieved from: https://trustedcomputinggroup.org/wp-content/uploads/TCG_Storage-Opal_Feature_Set_Single_User_Mode_v1.00_r2.00.pdf, Aug. 5, 2015, 33 Pages.

"TCG Storage Protection Mechanisms for Secrets", Retrieved from: https://trustedcomputinggroup.org/wp-content/uploads/TCG_Storage_Protection_Mechanisms_for_Secrets_1-00_1-00_FINAL.pdf, Mar. 5, 2012, 7 Pages.

"TCG Storage Security Subsystem Class: Opal", Retrieved from: https://trustedcomputinggroup.org/wp-content/uploads/TCG_Storage-Opal_SSC_v2.01_rev1.00.pdf, Aug. 5, 2015, 80 Pages.

"TCG Storage Opal SSC Feature Set: Configurable Locking for NVMe Namespaces and SCSI LUNs", Retrieved from: https://trustedcomputinggroup.org/wp-content/uploads/TCG_Storage_Configurable_Namespace_Locking-NS_and_LUN_v1p01_r1p11_31mar2021.pdf, Jan. 25, 2021, 50 Pages.

"International Search Report and Written Opinion Issued in PCT Application No. PCT/US22/048330", Mailed Date: Mar. 6, 2023, 14 Pages.

* cited by examiner

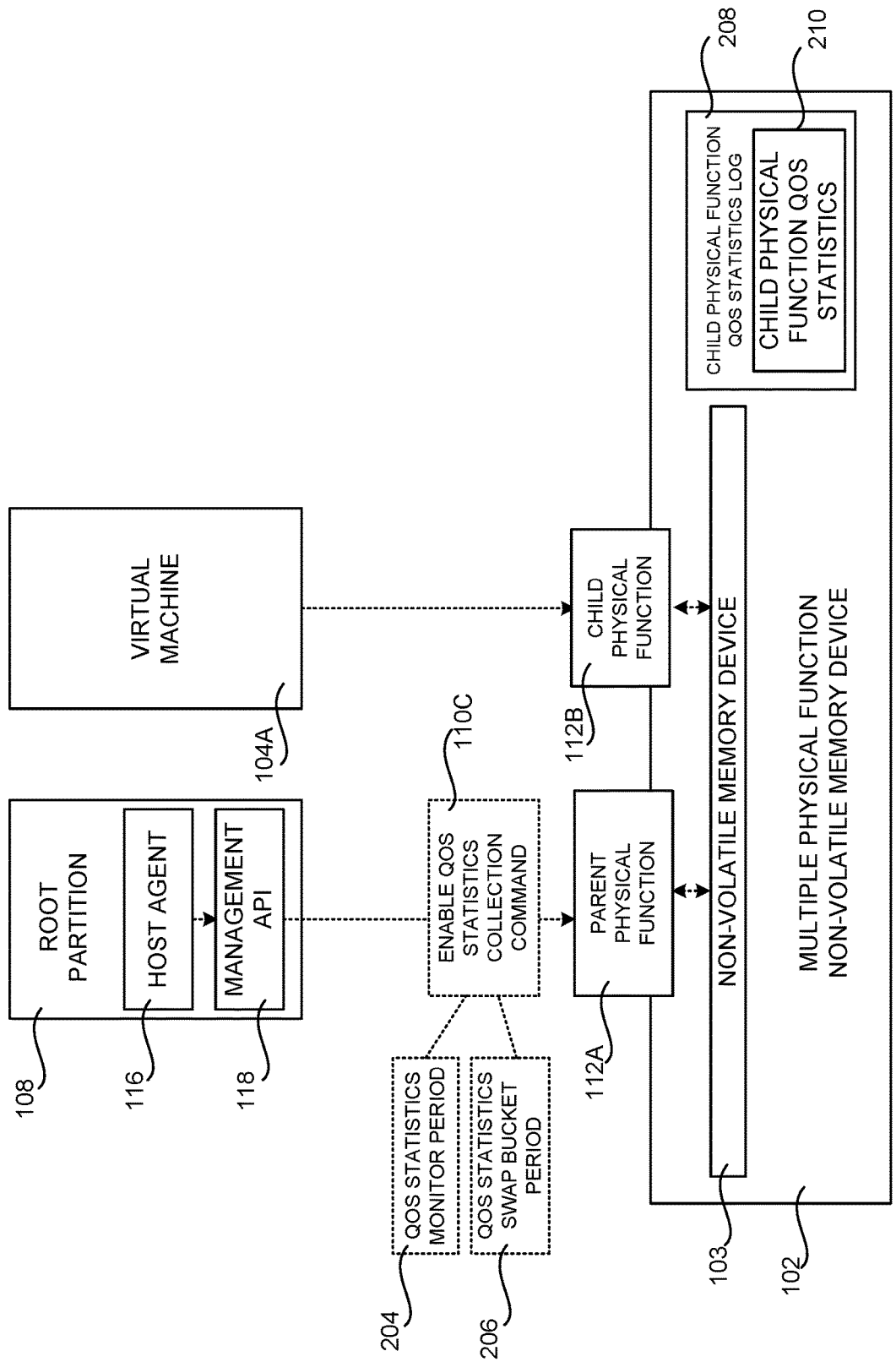

COLLECTING QUALITY OF SERVICE STATISTICS FOR IN-USE CHILD PHYSICAL FUNCTIONS OF MULTIPLE PHYSICAL FUNCTION NON-VOLATILE MEMORY DEVICES

BACKGROUND

Non-Volatile Memory Express ("NVMe") is an open host controller interface and storage protocol specification for accessing non-volatile storage devices attached via a Peripheral Component Interconnect Express ("PCIe") bus. Certain NVMe devices can expose multiple PCIe physical functions ("PFs"), such as independent NVMe controllers. These types of devices might be referred to herein as multiple physical function non-volatile memory devices ("MFNDs").

In a MFND, one PF, which might be referred to herein as a "parent PF," can act as a parent controller to receive and execute administrative commands. Other physical functions on a MFND, which might be referred to herein as "child PFs" or "children PFs," can act as child controllers that behave similarly to standard NVMe controllers. Through this mechanism, a MFND can enable the efficient sharing of input/output ("I/O") resources between virtual machines ("VMs") or bare metal instances. For example, child PFs can be directly assigned to and utilized by different VMs through various direct hardware access technologies, such as HYPER-V NVMe Direct or Discrete Device Assignment ("DDA").

Through the mechanism described above, the child PFs exposed by a single MFND can appear as multiple, separate physical devices to individual VMs. This allows individual VMs to directly utilize a portion of the available non-volatile storage space provided by a MFND with reduced central processing unit ("CPU") and hypervisor overhead.

Existing MFNDs, however, have limitations that restrict aspects of their functionality when used with VMs in the manner described above. As one specific example, it might not be possible to obtain detailed information regarding a VM's usage of the resources allocated to it by a MFND. Consequently, system administrators might not know when a VM is over or under-utilizing the resources provided by a MFND and, as a result, might not be able to make informed decisions regarding reallocating those MFND-provided resources or provisioning new MFND-provided resources. Current MFNDs can also suffer from other technical limitations, some of which are described in detail below.

It is with respect to these and other technical challenges that the disclosure made herein is presented.

SUMMARY

Technologies are disclosed herein for collecting Quality of Service ("QoS") statistics for in-use child PFs on MFNDs. Through implementations of the disclosed technologies, MFNDs can be configured to collect QoS statistics, referred to herein as "child PF QoS statistics," for in-use child physical functions that describe the utilization of resources provided by the child PFs to VMs. The collected child PF QoS statistics can then be utilized to inform decisions regarding reallocation of MFND-provided resources and provisioning of new MFND-provided resources, thereby making more efficient utilization of MFND hardware. The child PF QoS statistics can also be collected in a manner that reduces the performance impact of collecting the child PF QoS statistics on the MFND and minimizes the use of non-volatile memory. Other technical benefits not specifically mentioned herein can also be realized through implementations of the disclosed subject matter.

As discussed briefly above and in further detail below, the disclosed technologies include functionality for collecting QoS statistics for in-use child PFs of an MFND. In order to provide this functionality, a host computing device creates a child PF on a MFND and configures the child PF on the MFND to provide a specified QoS level to an associated VM executing on the host computing device. The host computing device also enables the MFND to collect child PF QoS statistics for the child PF.

The collected child PF QoS statistics describe the utilization of resources provided by child PFs to assigned VMs. The MFND provides the child PF QoS statistics from the MFND to the host computing device. As discussed above, the collected child PF QoS statistics can then be utilized to inform decisions regarding reallocation of MFND-provided resources, provisioning of new MFND-provided resources, and potentially other types of decisions.

In one embodiment, the specified QoS level defines maximum read input/output ("I/O") operations per second ("IOPS") and maximum write IOPS for the child PF. In this embodiment, the child PF QoS statistics for the child PF might specify a percentage of the maximum read IOPS and the maximum write IOPS provided by the child PF to the VM assigned to the child PF during a specified monitoring period.

The specified QoS level might also, or alternately, define a maximum read bandwidth and a maximum write bandwidth for the child PF. In this case, the child PF QoS statistics for the child PF might specify a percentage of the maximum read bandwidth and the maximum write bandwidth provided by the child PF to the VM assigned to the child PF during the specified monitoring period.

In other embodiments, the child PF QoS statistics for the child PF specify the percentage of read operations and write operations performed by the child PF during the specified monitoring period. The child PF QoS statistics for the child PF might also, or alternately, specify a size of I/O workloads performed by the child PF on behalf of an assigned VM during the monitoring period. The child PF QoS statistics might also, or alternately, specify an amount of the storage capacity of a non-volatile memory device on the MFND that is in use by a VM. Other types of child PF QoS statistics can be collected in the manner described herein in other embodiments.

In some embodiments, the host computing device specifies the duration of a QoS statistics monitor period and the duration of a QoS statistics swap bucket period to the MFND. In these embodiments, the MFND is further configured to store the child physical function QoS statistics in a log, which might be referred to herein as the "active log," during the duration of the QoS statistics monitor period. When the QoS statistics swap bucket period elapses, the MFND swaps the active log with another log, which might be referred to herein as the "save log." In these embodiments, the MFND provides the child PF QoS statistics from the MFND to the host computing device from the save log. In some embodiments, the MFND also generates a notification, such as an asynchronous event, to the host computing device when the QoS statistics swap bucket period elapses. In response thereto, the host computing device may request the child PF QoS statistics from the MFND.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2C is a computing architecture diagram showing aspects of one mechanism disclosed herein for enabling the collection of child PF QoS statistics by a MFND, according to one embodiment;

DETAILED DESCRIPTION

Figure 1:
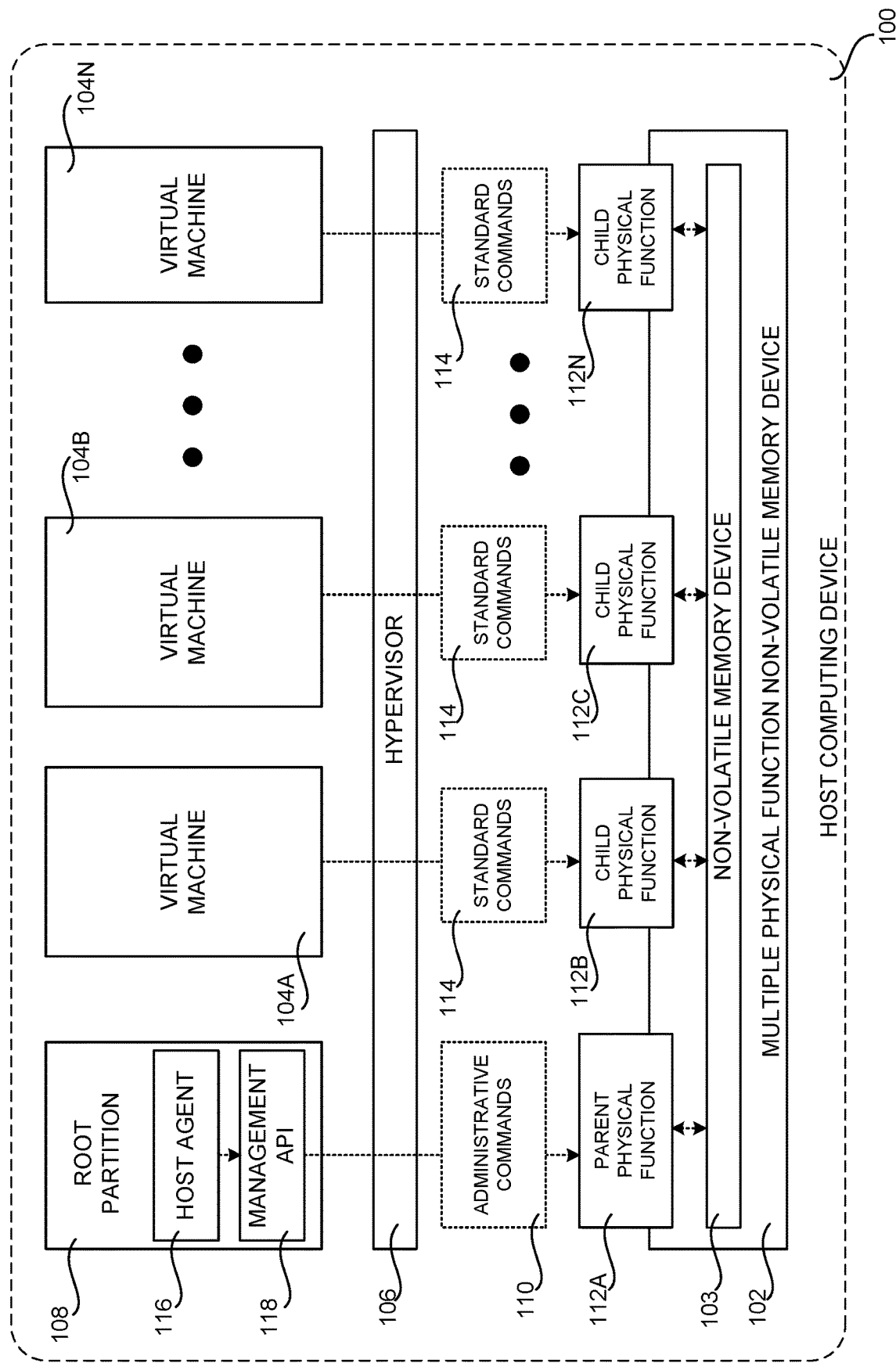
FIG. 1 is a computing architecture diagram that shows aspects of the configuration and operation of a MFND that can implement the embodiments disclosed herein, according to one embodiment.

The following detailed description is directed to technologies for collecting QoS statistics for in-use child PFs on MFNDs. As discussed briefly above, MFNDs implementing the disclosed technologies can collect child PF QoS statistics for in-use child PFs that describe the utilization of resources provided by the child PFs to VMs. The child PF QoS statistics can be collected and stored in a manner that reduces the performance impact of collecting the child PF QoS statistics on the MFND and minimizes the use of volatile and non-volatile memory.

Through the use of the disclosed functionality, child PF QoS statistics can be utilized to inform decisions regarding reallocation of MFND-provided resources and provisioning of new MFND-provided resources, thereby making more efficient utilization of MFND hardware. Other technical benefits not specifically mentioned herein can also be realized through implementations of the disclosed subject matter.

While the subject matter described herein is presented in the general context of NVMe multiple physical function devices, those skilled in the art will recognize that the technologies disclosed herein can be used with other types of multiple physical function devices, including other types of multiple physical function non-volatile memory devices. Those skilled in the art will also appreciate that the subject matter described herein can be practiced with various computer system configurations, including host computers in a distributed computing environment, hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for collecting QoS statistics for in-use child PFs on MFNDs will be described.

FIG. 1 is a computing architecture diagram that shows aspects of the configuration and operation of a MFND 102 that can implement the embodiments disclosed herein, according to one embodiment. As discussed briefly above, the MFND 102 is an NVMe Specification-compliant device in some embodiments. The MFND 102 can be hosted by a host computing device 100 (which might be referred to herein simply as a "host"), such as a server computer operating in a distributed computing network such as that described below with reference to FIG. 8.

As also discussed briefly above, NVMe is an open logical device interface specification for accessing non-volatile storage media. In some embodiments, an NVMe device is accessible via a PCIe bus. In other embodiments, an NVMe device is accessible via a network or other packet-based interface. The NVMe Specification defines a register interface, command set, and collection of features for PCIe-based solid-state storage devices ("SSDs") with the goals of high performance and interoperability across a broad range of non-volatile memory subsystems. The NVMe Specification does not stipulate the ultimate usage model, such as solid-state storage, main memory, cache memory or backup memory.

NVMe provides an alternative to the Small Computer System Interface ("SCSI") standard and the Advanced Technology Attachment ("ATA") standard for connecting and transmitting data between a host computing device 100 and a peripheral target storage device. The ATA command set in use with Serial ATA ("SATA") SSDs and the SCSI command set for Serial Attached SCSI ("SAS") SSDs were developed at a time when hard disk drives ("HDDs") and tape were the primary storage media. NVMe was designed for use with faster media.

The main benefits of NVMe-based PCIe SSDs over SAS-based and SATA-based SSDs are reduced latency in the host software stack, higher IOPS and potentially lower power consumption, depending on the form factor and the number of PCIe lanes in use.

NVMe can support SSDs that use different types of non-volatile memory, including NAND flash and the 3D XPOINT technology developed by INTEL and MICRON TECHNOLOGY. Supported form factors include add-in PCIe cards, M.2 SSDs and U.2 2.5-inch SSDs. NVMe reference drivers are available for a variety of operating systems, including the WINDOWS and LINUX operating systems. Accordingly, it is to be appreciated that the MFND 102 described herein is not limited to a particular type of non-volatile memory, form factor, or operating system.

As described briefly above, the MFND 102 described herein includes capabilities for exposing multiple PFs 112A-112N to the host computing device 100. Each of the PFs 112A-112N is an independent NVMe controller in one embodiment. The PFs 112A-112N are other types of controllers in other embodiments. At least a plurality of PFs 112A-112N are independent NVMe controllers and at least one distinct PF 112A-112N is a non-NVME controller in other embodiments.

One PF 112A in the MFND 102, which might be referred to herein as the "parent PF 112A" or the "parent controller 112A," acts as a parent controller. In one embodiment, for instance, the parent PF 112A is the privileged PCIe function zero of the MFND 102. In this regard, it is to be appreciated that the parent controller might be configured as another PCIe function number in other embodiments. The parent PF 112A and child PFs described below might also be device types other than NVMe devices in some embodiments.

The parent PF 112A can act as a parent controller to receive and execute administrative commands 110 generated by a root partition 108. In particular, and as described in greater detail below, the parent PF 112A can manage child PFs 112B-112N such as, for example, by creating, deleting, modifying, and querying the child PFs 112B-112N. The child PFs 112B-112N might be referred to herein interchangeably as "child PFs 112B-112N" or "child controllers 112B-112N."

The child PFs 112B-112N are regular PCIe physical functions of the MFND 102. The child PFs 112B-112N can behave like regular and independent NVMe controllers. The child controllers 112B-112N can also support the administrative and I/O commands defined by the NVMe Specification.

Through the use of the multiple PFs 112A-112N exposed by the MFND 102, I/O resources provided by the MFND 102 can be efficiently shared between VMs 104A-104N. For instance, child PFs 112B-112N can be directly assigned to different VMs 104A-104N, respectively, through various direct hardware access technologies such as HYPER-V NVMe Direct or DDA. In this way, the child PFs 112B-112N exposed by a single MFND 102 can appear as multiple, separate physical devices to individual VMs 104A-104N, respectively. This allows individual VMs 104A-104N to directly utilize a respective portion of the available storage space provided by a non-volatile memory device 103 on the MFND 102 with reduced CPU and hypervisor 106 overhead.

In some configurations, the host computing device 100 operates in a distributed computing network, such as that described below with regard to FIG. 8. Additionally, the host computing device 100 executes a host agent 116 and a management application programming interface ("API") 118 in order to enable access to aspects of the functionality disclosed herein in some embodiments.

The host agent 116 can receive commands from other components, such as other components in a distributed computing network such as that described below with regard to FIG. 8, and make calls to the management API 118 to implement the commands. In particular, the management API 118 can issue administrative commands to the parent PF 112A to perform the various functions described herein. Details regarding various methods exposed by the management API 118 to the host agent 116 for implementing the functionality disclosed herein are described below.

In some embodiments, the MFND 102 has two modes of operation: regular user mode and super administrator mode. In regular user mode, only read-only functions can be executed. The non-read-only management functions described herein (e.g. set the QoS level for a PF, etc.) must be executed in the super administrator mode. If an attempt is made to execute these functions in regular user mode, an error (which might be referred to herein as an "ERROR_ACCESS_DENIED" error) will be returned. The API 118 exposes methods for getting the device operation mode (which might be referred to herein as the "GetDeviceOperationMode" method) and switching the device operation mode (which might be referred to herein as the "SwitchDeviceOperationMode" method) in some embodiments.

As discussed briefly above, existing MFNDs 102 have limitations that restrict aspects of their functionality when used with VMs 104 in the manner described above. As one specific example, it might not be possible to obtain detailed information regarding a VM's 104 usage of the resources allocated to it by a MFND 102. Consequently, system administrators might not know when a VM 104 is over or under-utilizing the resources provided by a MFND 102 and, as a result, might not be able to make informed decisions regarding reallocating those MFND-provided resources or provisioning new MFND-provided resources. The technologies presented herein address these and potentially other technical considerations by enabling collection of QoS statistics for in-use child PFs 112B-112N of a MFND 102. Additional details regarding these aspects will be provided below.

Figure 2A:
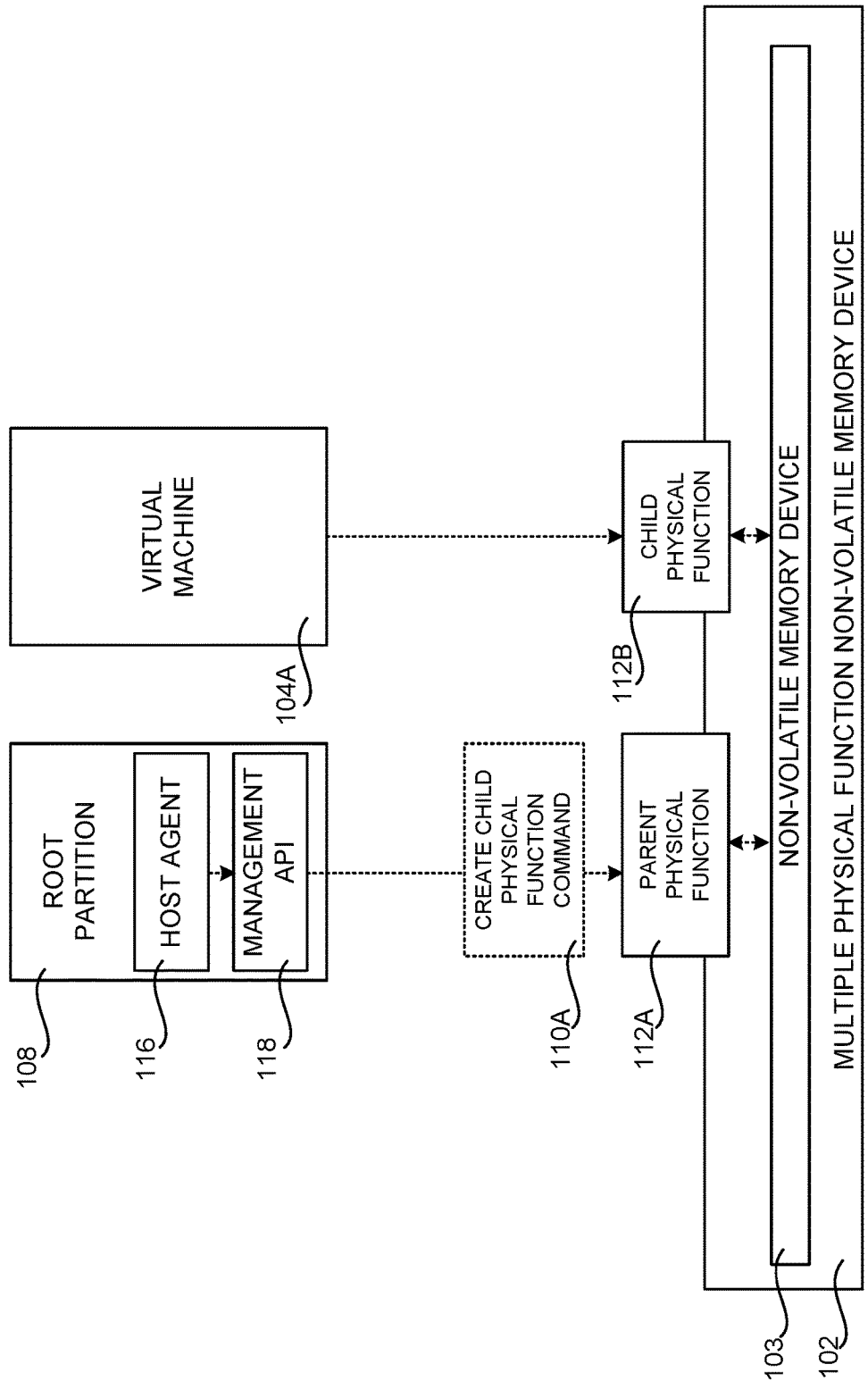
FIG. 2A is a computing architecture diagram showing aspects of one mechanism disclosed herein for creating child PFs on a MFND, according to one embodiment.

FIG. 2A is a computing architecture diagram showing aspects of one mechanism disclosed herein for creating child PFs 112 on a MFND 102, according to one embodiment. As shown in FIG. 2A, the host agent 116 can create a new child PF 112B on the MFND 102 by calling an appropriate method exposed by the management API 118. In response thereto, the management API 118 issues a command 110A to the parent PF 112A to create the desired child PF 112B. The MFND 102, in turn, creates the child PF 112B. Thereafter, a VM 104A may be assigned to the child PF 112B. Additional details regarding the creation of child PFs 112B on a MFND 102 and assignment of a VM 104A to a child PF 112B will be provided below with regard to FIG. 5.

Figure 2B:
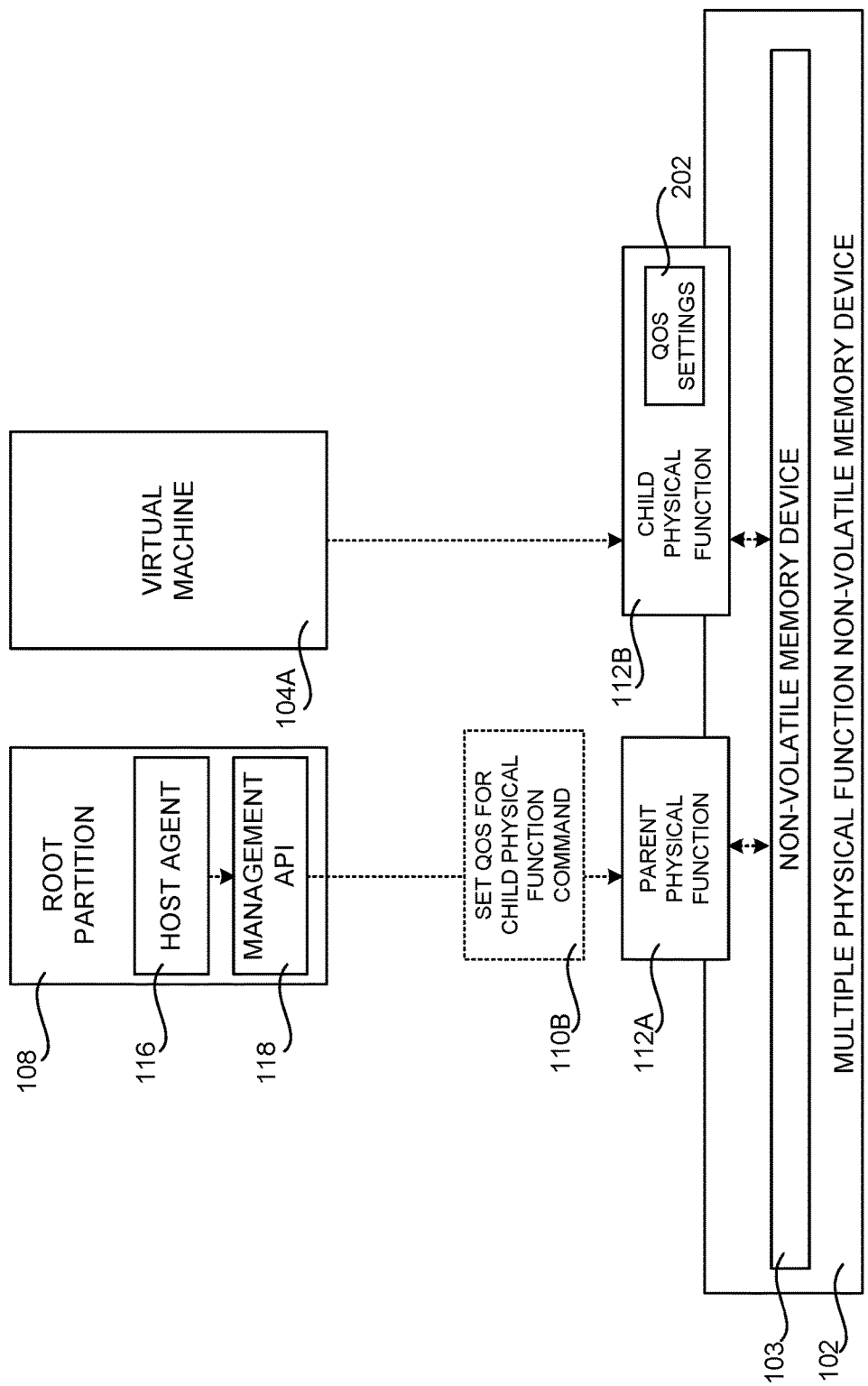
FIG. 2B is a computing architecture diagram showing aspects of one mechanism disclosed herein for setting the QoS for a child PF on a MFND, according to one embodiment.

FIG. 2B is a computing architecture diagram showing aspects of one mechanism disclosed herein for setting the QoS level for a child PF 112B on a MFND 102, according to one embodiment. As discussed briefly above, once a child PF 112B has been created in the manner described above with regard to FIG. 2A, the MFND 102 can provide functionality for managing the QoS level provided by the child PFs 112B. For example, and without limitation, implementations of the disclosed technologies can also enable a host agent 116 to query and modify the QoS level provided by a child PF 112B of a MFND 102.

In some embodiments, the MFND 102 supports multiple storage service level agreements ("SLAs"). Each SLA defines a different QoS level to be provided by a PF 112A-112N. QoS levels that can be supported by child PFs 112 on the MFND 102 include, but are not limited to, a "reserve mode" wherein a child PF 112 is allocated at least a specified minimum amount of bandwidth and IOPS, a "limit mode" wherein a child PF 112 is allocated at most a specified maximum amount of bandwidth and IOPS, and a "mixed mode" wherein a child PF 112 is allocated at least a specified minimum amount of bandwidth and IOPS but at most a specified maximum amount of bandwidth and IOPS. Other QoS levels can be implemented in other embodiments.

The embodiments disclosed herein allow the parent PF 112A to individually define the QoS level for each child PF 112B-112N in a single MFND 102. For instance, the parent PF 112A might define the minimum and/or maximum bandwidth and/or IOPS to be supported by each child PF 112B-112N. In order to provide this functionality, the host agent 116 can call a method exposed by the management API 118. In response to such a call, the management API 118 issues a command 110B to the parent physical function 112A that includes QoS settings 202 for a child PF 112B. The child PF 112B then utilizes the QoS settings 202 when processing requests from an assigned VM 104A.

One illustrative method for modifying the settings of child PFs 112B-112N (which might be referred to herein as the "UpdateChildPhysicalFunctionSettings" method) takes an identifier (e.g. a handle) to a MFND 102, an identifier (e.g. a serial number) of a child PF 112, and a pointer to a data structure containing the QoS settings 202 for the child PF 112 as input. The data structure can include data specifying the resources (e.g. the amount of storage space, namespaces, and interrupt vectors that the identified PF 112 is to use) and the QoS level that are to be assigned to the identified child PF 112. The UpdateChildPhysicalFunctionSettings method returns a success message if the supplied settings were successfully applied to the identified child PF 112 and otherwise returns an error code.

An illustrative method for querying the settings of child PFs 112B-112N (which might be referred to herein as the "QueryChildPhysicalFunctionSettings" method) takes an identifier (e.g. a handle) for a MFND 102 and an identifier (e.g. a serial number) of a child PF 112 as input. The QueryChildPhysicalFunctionSettings method returns a pointer to a data structure containing the current settings of the identified child PF 112. As discussed above, such a data structure can include data specifying the resources (e.g. the amount of storage space, namespaces, and interrupt vectors that the PF 112 can use) and QoS settings 202 that are currently assigned to the identified child PF 112.

Figure 3:
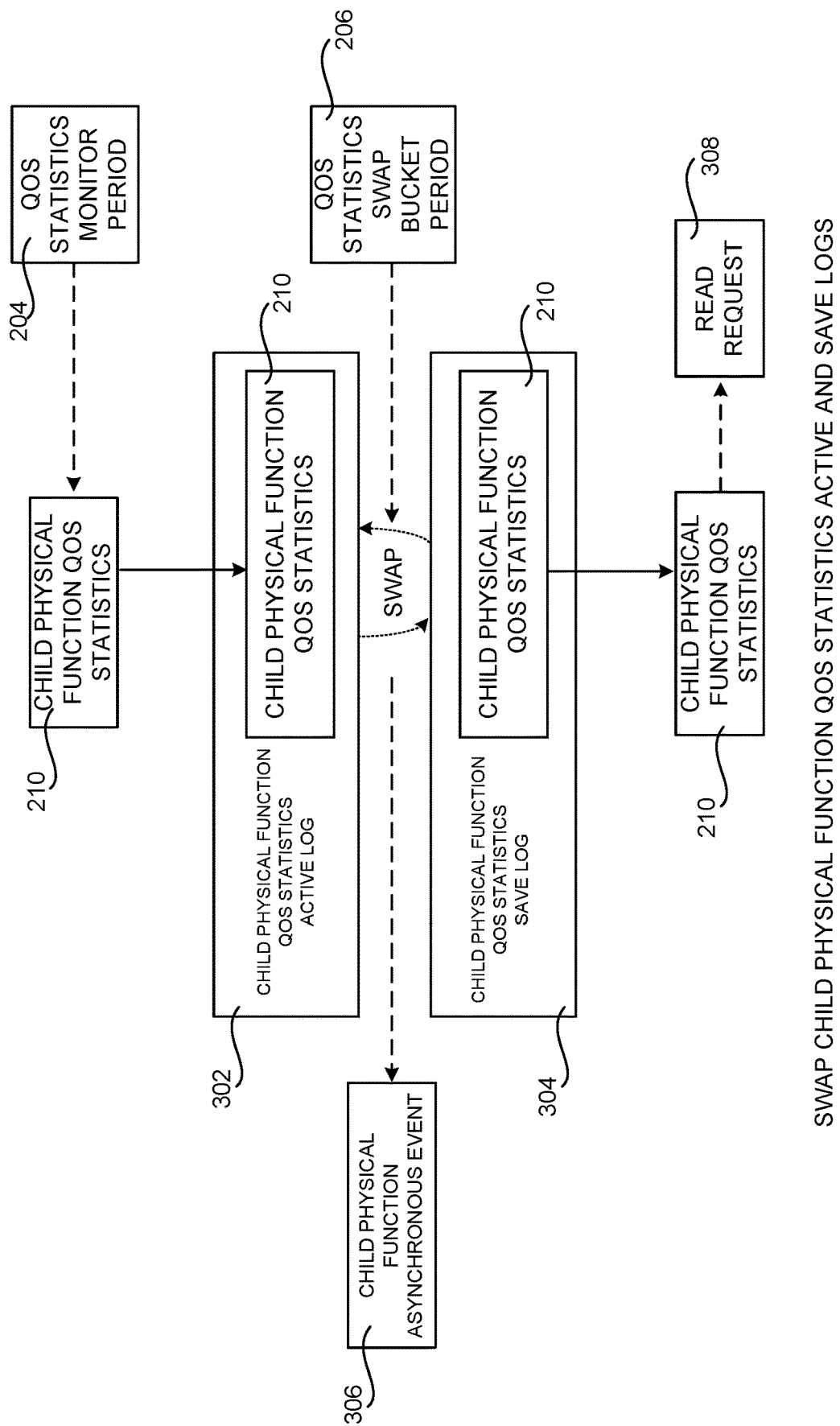
FIG. 3 is a computing architecture diagram showing aspects of one mechanism disclosed herein for swapping a child PF QoS statistics active log and a child PF QoS statistics save log on a MFND, according to one embodiment.

FIG. 2C is a computing architecture diagram showing aspects of one mechanism disclosed herein for enabling the collection of child PF QoS statistics 210 by a MFND 102, according to one embodiment. As shown in FIG. 2C, the host agent 116 can configure the MFND 102 to collect child PF QoS statistics 210 by calling an appropriate method on the management API 118. In response thereto, the management API 118 issues a command 110C to the parent physical function 112A instructing the MFND 102 to enable the collection of the child PF QoS statistics 210. The MFND 102 stores the child PF QoS statistics 210 in a child PF statistics log 208 in one embodiment. Details regarding the configuration and use of the child PF statistics log 208 will be provided below with respect to FIGS. 3 and 4.

In one embodiment a single command 110C can be utilized to enable collection of child PF QoS statistics 210 for all in-use child PFs 112B-112N. Alternately, per child PF 112 commands 110C can be issued to enable collection of child QoS statistics 210 by individual child PFs 112B-112N.

As also shown in FIG. 2C, the command 110C specifies a QoS statistics monitor period 204 and a QoS statistics swap bucket period 206 in some embodiments. As will be described in greater detail below, the QoS statistics monitor period 204 specifies the duration of a monitoring period during which the MFND 102 is to collect the child PF QoS statistics 210. In one embodiment, the QoS statistics monitor period 204 is specified in seconds with a minimum value of 60 seconds and increments of 30 seconds. The QoS statistics monitor period 204 might be specified in other ways in other embodiments.

The QoS statistics swap bucket period 206 defines a period of time after which the MFND 102 is to swap an "active log" with a "save log." In these embodiments, the MFND 102 is further configured to store the child physical function QoS statistics 210 in the active log during the duration of the QoS statistics monitor period 204. In one embodiment, the QoS statistics swap bucket period 206 is specified in minutes, with a minimum value of 30 minutes and a maximum value of 1440 minutes. The QoS statistics swap bucket period 206 might be specified in other ways in other embodiments. Additional details regard the contents and use of the active and save logs will be provided below with regard to FIGS. 3 and 4.

Figure 2D:
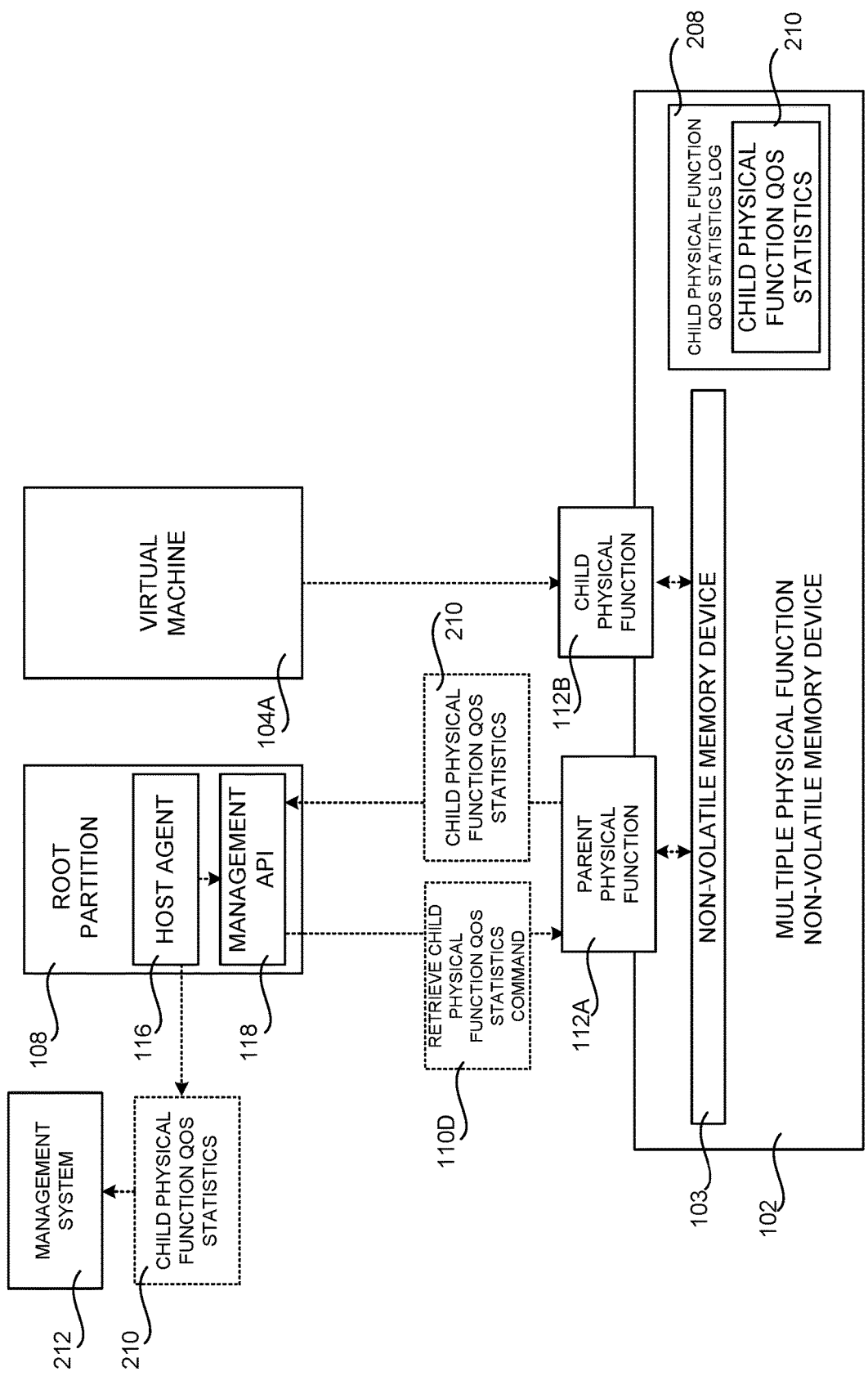
FIG. 2D is a computing architecture diagram showing aspects of one mechanism disclosed herein for retrieving child PF QoS statistics from a MFND, according to one embodiment.

FIG. 2D is a computing architecture diagram showing aspects of one mechanism disclosed herein for retrieving child PF QoS statistics 210 from a MFND 102, according to one embodiment. FIG. 2D will be described in conjunction with FIG. 3, which is a computing architecture diagram showing aspects of one mechanism disclosed herein for swapping a child PF QoS statistics active log 302, which might be referred to simply as the "active log 302," and a child PF QoS statistics save log 304, which might be referred to simply as the "save log 304," on a MFND 102, according to one embodiment.

As described briefly above, the child PF QoS statistics log 208 is implemented using two separate logs, the child PF QoS statistics active log 302 and the child PF QoS statistics save log 304, in some embodiments. When the QoS statistics swap bucket period 206 described above elapses, the MFND 102 swaps the active log 302 with the save log 304 and clears the active log 302. This can be performed as an atomic operation in order to avoid corruption of the logs 302 and 304. In these embodiments, the MFND 102 provides the child PF QoS statistics 210 from the save log 304 in response to requests 308 received from the host computing device 100. The MFND 102 also provides functionality for enabling the host computing device 100 to retrieve the contents of the active log 302 in some embodiments.

In some embodiments, the MFND 102 also generates a notification, such as an asynchronous event 306, to the host computing device 100 when the QoS statistics swap bucket period elapses 206. In response to receiving the notification, the host computing device 100 may issue a command 110D to the MFND 102 to retrieve the child PF QoS statistics 210 from the MFND 100. In response thereto, the MFND 102 retrieves the child PF QoS statistics 210 from the save log 304 and returns the child PF QoS statistics 210 to the host 100 in response to the command 110D. In turn, the host agent 116 might provide the child PF QoS statistics 210 to a remote management system 212 or another component.

In one embodiment, the specified QoS level defines maximum read IOPS and maximum write IOPS for a child PF 112B. In this embodiment, the child PF QoS statistics 210 for the child PF 112B specify the maximum read IOPS and the maximum write IOPS provided by the child PF 112B to the VM 104A assigned to the child PF 112B during the QoS statistics monitor period 204.

The maximum read IOPS, and the maximum write IOPS are specified as a percentage of the maximum read IOPS and the maximum write IOPS specified by the QoS level for the child PF 112B in some embodiments. By expressing the maximum read IOPS and the maximum write IOPS as a percentage of the maximum read IOPS and the maximum write IOPS specified by the QoS level, the maximum read IOPS and the maximum write IOPS can be expressed using only a single byte, thereby saving space on the non-volatile memory device 103.

The specified QoS level might also, or alternately, define a maximum read bandwidth and a maximum write bandwidth for the child PF 112B. In this case, the child PF QoS statistics 210 for the child PF 112B specify the maximum read bandwidth and the maximum write bandwidth provided by the child PF 112B to the VM 104A assigned to the child PF 112B during the specified QoS statistics monitor period 204.

In some embodiments, the maximum read bandwidth and the maximum write bandwidth are specified as a percentage of the maximum read bandwidth and the maximum write bandwidth specified by the QoS level for the child PF 112B. By expressing the maximum read bandwidth and a maximum write bandwidth as a percentage of the maximum read bandwidth and a maximum write bandwidth specified by the QoS level, the maximum read bandwidth and a maximum write bandwidth can be expressed using only a single byte, thereby saving space on the non-volatile memory device 103.

In other embodiments, the child PF QoS statistics 210 for the child PF 112B specify a percentage of read operations and write operations performed by the child PF 112B during the specified QoS statistics monitor period 204. The child PF QoS statistics 210 for the child PF 112B might also, or alternately, specify a size of I/O workloads performed by the child PF 112B on behalf of an assigned VM 104A during the QoS statistics monitor period 204.

The child PF QoS statistics 210 might also, or alternatively, specify an amount of the storage capacity of a non-volatile memory device 103 on the MFND 102 that is in use by a VM 104A. In these embodiments, the amount of the storage capacity of a non-volatile memory device 103 on the MFND 102 that is in use by a VM 104A may be obtained from the MFND 102 by issuing an identified child controller command to a child PF 112B to retrieve the Namespace Utilization field ("NUSE") defined by the NVMe Specification. Other types of child PF QoS statistics 210, such as but not limited to read/write I/O command latency and bytes written to media, can be collected in the manner described herein in other embodiments.

Figure 4:
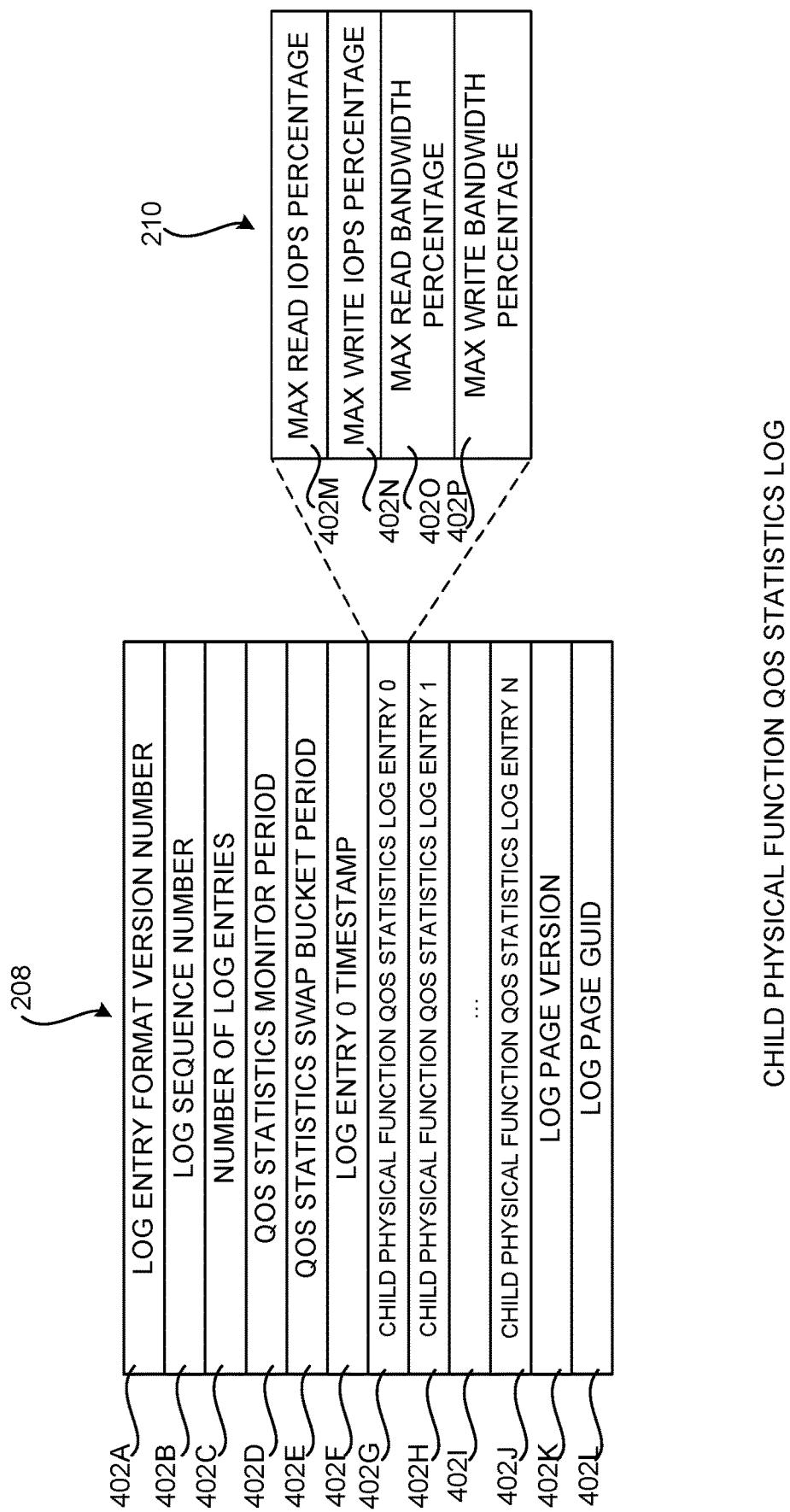
FIG. 4 is a data structure diagram showing an illustrative configuration for a child PF QoS statistics log maintained by a MFND, according to one embodiment.

FIG. 4 is a data structure diagram showing an illustrative configuration for the child PF QoS statistics log 208 maintained by a MFND 102, according to one embodiment. As shown in FIG. 4, the child PF QoS statistics log 208 includes the fields 402A-402P in the illustrated embodiment. In this regard, it is to be appreciated that the illustrated configuration is merely illustrative, and that other types and configurations of data might be utilized. It is to be further appreciated that a single child PF QoS statistics log 208 might store the child PF QoS statistics 210 for all of the in-use child PFS 112B-112N on a MFND 102 or separate child PF QoS statistics logs 208 might be maintained for each of the in-use child PFS 112B-112N.

The field 402A stores data indicating a version number identified with the format of the child PF QoS statistics log 208. The version number might be modified following changes to the format of the child PF QoS statistics log 208.

The field 402B stores a sequence number that is incremented whenever an active log 302 is generated (i.e., after each QoS statistics swap bucket period 206 elapses). When the value reaches 255 and a new active log 302 is generated, the value is reset to zero.

The field 402C stores data identifying the number of log entries in the child PF QoS statistics log 208. As described in greater detail below, the log entries are stored in the fields 402G-402J.

The field 402D stores data identifying the child PF QoS statistics monitor period 204 and the field 402E stores data identifying the child PF QoS statistics swap bucket period 206 described above. The field 402F stores a timestamp associated with the first log entry in the child PF QoS statistics log 208. In one embodiment, the timestamp uses the data format for a timestamp as defined by the NVMe Specification. If the host computing device 100 does not set the timestamp, this field contains the time since the MFND 102 last powered up.

As discussed briefly above, the fields 402G-402J contain log entries containing the child PF QoS statistics 210. In the illustrated example, for instance, each log entry includes fields 402M-402P specifying the maximum read IOPS percentage, the maximum write IOPS percentage, the maximum read bandwidth percentage, and the maximum write bandwidth percentage during the monitoring period, respectively. As discussed above, the log entries can include other types of child PF QoS statistics 210, some of which were described above, in other embodiments. The field 402K contains a version number for the log entries and the field 402L stores a globally unique identifier ("GUID") associated with the log entries.

Figure 5:
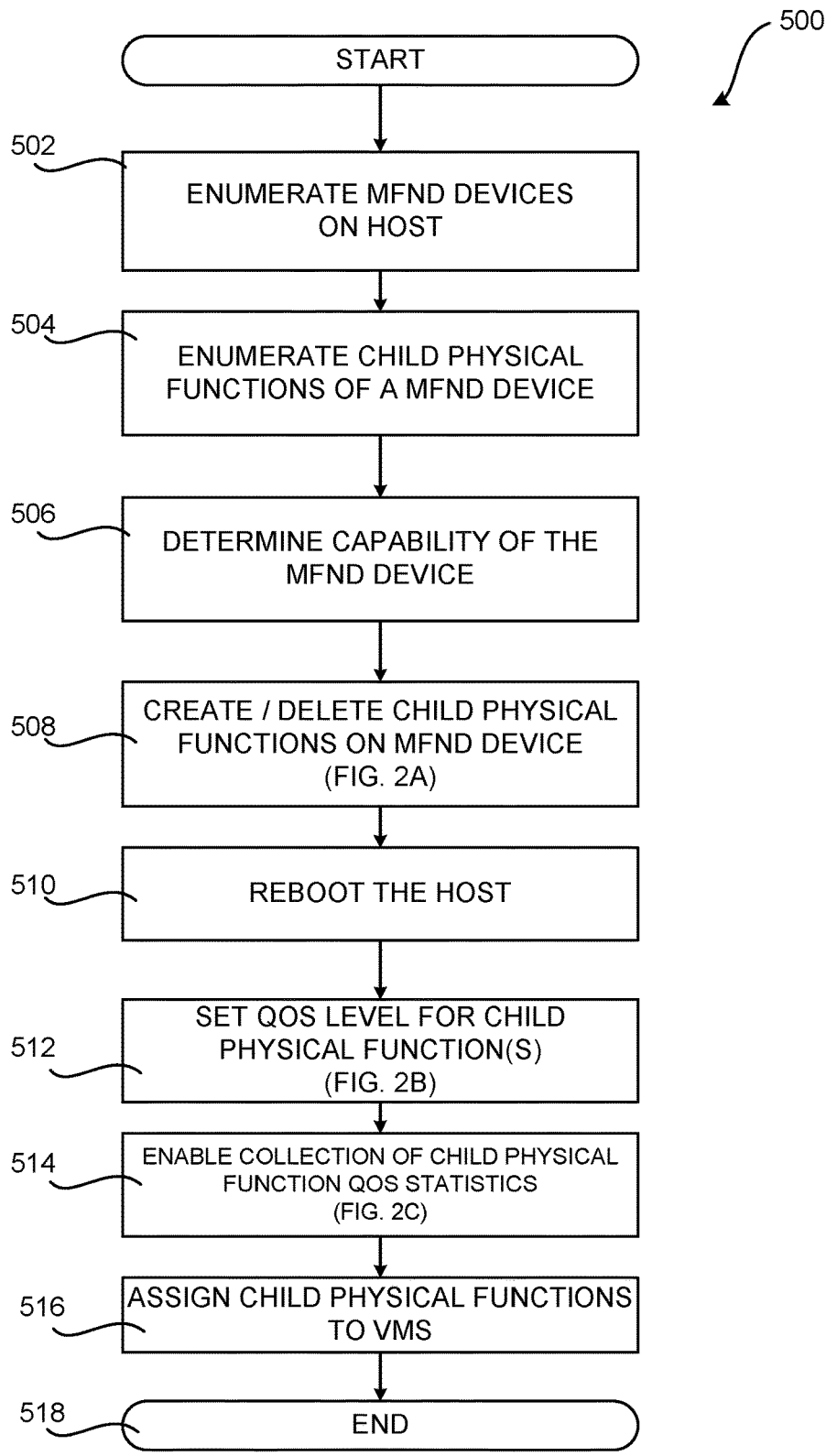
FIG. 5 is a flow diagram showing a routine that illustrates aspects of a method for configuring child PFs on a MFND, according to one embodiment disclosed herein.

FIG. 5 is a flow diagram showing a routine 500 that illustrates aspects of a method for configuring child PFs 112 on a MFND 102, according to one embodiment disclosed herein. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where the host agent 116 can enumerate some or all of the MFND devices 102 that are present in a host 100. One particular method (which might be referred to herein as the "GetMFNDList" method) for enumerating the MFND devices 102 connected to a host 100 returns device paths of all MFND devices 102 connected to a host 100. If no MFND devices 102 are connected, or none are enumerated, the GetMFNDList method returns an error code.

From operation 502, the routine 500 proceeds to operation 504, where the host agent 116 can enumerate the child PFs 112B-112N that are currently present on a MFND device 102 identified at operation 502. One method (which might be referred to herein as the "GetChildPhysicalFunctionList" method) for enumerating the child PFS 112A-112N on a MFND device 102 takes an identifier (e.g. a handle) for a particular MFND device 102 as input and returns adapter serial numbers of all child PFs 112B-112N on the identified device.

From operation 504, the routine 500 proceeds to operation 506, where the host agent 116 can determine the capabilities of the MFND device 102 identified at operation 502. For example, the host agent 116 can determine the maximum number of child PFs 112B-112N supported by the MFND device 102.

One method (which might be referred to herein as the "GetDeviceCapability" method) for getting the capabilities of a MFND device 102 takes an identifier (e.g. a handle) for a particular MFND device 102 as input and returns a device capability structure that specifies the capabilities of the identified device. In one embodiment, the device capability structure includes data identifying the maximum and available child PFs 112B-112N, I/O queue pair count, interrupt count, namespace count, storage size, bandwidth, and IOPS of the identified device. The device capability structure might include additional or alternate data in other embodiments.

Once the capabilities of the MFND device 102 have been determined, the routine 500 can proceed from operation 506 to operation 508, where child PFs 112B-112N can be created or deleted on the MFND device 102. By default, the MFND 102 has only one PF 112, the parent PF 112A, which is reserved for receiving administrative commands 110 from the root partition 108.

In order to assign individual child PFs 112B-112N to VMs 104A-104N, the child PFs 112B-112N are first created. The newly created child PFs 112B-112N will appear to the host 100 following a reboot. One method for creating child PFs 112B-112N (which might be referred to herein as the "CreateChildPhysicalFunction" method) takes an identifier (e.g. a handle) to a MFND 102 and a pointer to a data structure containing the settings for the new child PF 112 as input. The data structure can include data specifying the resources (e.g. the amount of storage space, namespaces, and interrupt vectors that the new PF 112 can use) and QoS level that are to be assigned to the new child PF 112. The CreateChildPhysicalFunction method returns an identifier (e.g. a serial number) for the new child PF 112 as output if it completes successfully.

Child PFs 112B-112N and their settings will persist across reboots of the host 100, so the maximum number of child PFs 112B-112N to be supported may be initially created to avoid rebooting the host 100 in the future. If a MFND 102 already has child PFs 112B-112N, either as a result of a manufacturing configuration or previous user configuration, additional child PFs 112B-112N can be created or deleted in order to configure the MFND 102 with the desired number of child PFs 112B-112N to be supported.

One method for deleting child PFs 112B-112N (which might be referred to herein as the "DeleteChildPhysicalFunction" method) takes an identifier for a MFND 102 (e.g. a handle) and the serial number for the child PF 112 to be deleted as input. The DeleteChildPhysicalFunction returns a success message if the identified child PF 112 was successfully deleted and otherwise returns an error code.

Once the host 100 has rebooted, the routine 500 proceeds from operation 510 to operation 512, where the QoS level for the newly created child PFs 112B-112N are set in the manner described above with regard to FIG. 2B. Once the QoS levels have been set for the child PFs 112B-112N, the routine 500 proceeds from operation 512 to operation 514, where the MFND 102 enables the collection of child PF QoS statistics 210 for in-use child PFs 112B-112N of the MFND 102 in the manner described above with regard to FIGS. 2C and 3 and in further detail below with regard to FIG. 6.

The routine 500 proceeds from operation 514 to operation 516, where the child PFs 112B-112N provided by a MFND 102 can be assigned to VMs 104A-104N. As described briefly above, in some embodiments newly created child PFs 112B-112N have zero storage size, minimal flexible resources, and no defined QoS level. In other embodiments, newly created child PFs 112B-112N may have a default QoS level, a default amount of storage, and/or default configurations for other resources. Accordingly, the host 100 might need to provision the resources (NVM space, I/O queue pair count, QoS level, etc.) to a child PF 112B-112N before it can be assigned to a VM 104 using DDA, HYPER-V NVMe Direct, or another direct storage assignment technology.

The child PFs 112B-112N can also be securely erased before assignment to a VM 104. There is no host reboot involved in this workflow. One method for securely erasing child PFs 112B-112N (which might be referred to herein as the "SecureEraseChildPhysicalFunction" method) takes an identifier for a MFND 102 (e.g. a handle) and the serial number for the child PF 112 to be erased as input. The SecureEraseChildPhysicalFunction returns a success message if the identified child PF 112 was successfully erased and otherwise returns an error code. The routine 500 then proceeds from operation 516 to operation 518, where it ends.

Figure 6:
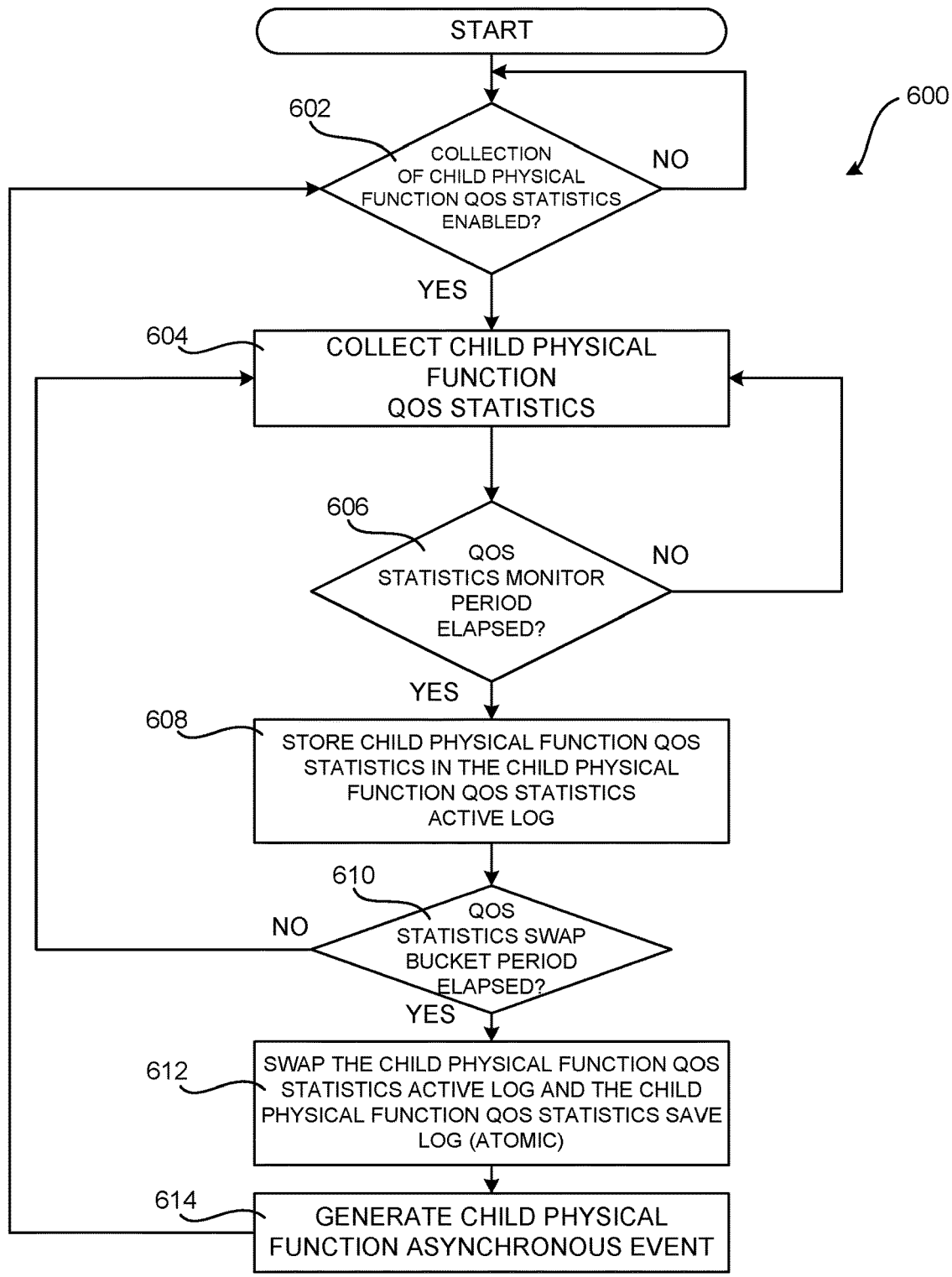
FIG. 6 is a flow diagram showing a routine that illustrates aspects of a method for collecting QoS statistics for in-use child PFs of a MFND, according to one embodiment disclosed herein.

FIG. 6 is a flow diagram showing a routine 600 that illustrates aspects of a method for collecting child PF QoS statistics 210 for in-use child PFs 112 of a MFND 102, according to one embodiment disclosed herein. The routine 600 begins at operation 602, where the MFND 102 determines whether collection of child PF QoS statistics 210 has been enabled in the manner described above. If the collection of child PF QoS statistics 210 has been enabled, the routine 600 proceeds from operation 602 to operation 604.

At operation 604, the MFND 102 collects the child PF QoS statistics 210 in the manner described above. The routine 600 then proceeds from operation 604 to operation 606, where the MFND 102 determines whether the QoS statistics monitor period 204 has elapsed. If the QoS statistics monitor period 204 has not elapsed, the routine 600 proceeds from operation 606 back to operation 604, where the MFND 102 can continue to collect the child PF QoS statistics 210 in the manner described above. If the QoS statistics monitor period 204 has elapsed, the routine 600 proceeds from operation 606 to operation 608.

At operation 608, the MFND 102 stores the child PF QoS statistics 210 in a log entry in the child PF QoS statistics active log 302 in the manner described above. The routine 600 then proceeds from operation 608 to operation 610, where the MFND 102 determines whether the QoS statistics swap bucket period 206 has elapsed. If the QoS statistics swap bucket period 206 has not elapsed, the routine 600 proceeds back to operation 604, where the MFND 102 continues to collect child PF QoS statistics 210 and store the child PF QoS statistics 210 in entries in the active log 302 in the manner described above.

If the QoS statistics swap bucket period 206 has elapsed, the routine 600 proceeds from operation 610 to operation 612, where the MFND 102 atomically swaps the active log 302 and the save log 304 and clears the active log 302 in the manner described above. The routine 600 then proceeds from operation 612 to operation 614, where the MFND 102 generates a notification, such as an asynchronous event 306, to the host computing device 100 to inform the host computing device 100 that child PF QoS statistics 210 are available from the MFND 102. As discussed above, the host computing device 100 might subsequently transmit a command 110D requesting the child PF QoS statistics 210. The MFND 102 responds to the request with child PF QoS statistics 210 retrieved from the save log 304. The routine 600 then proceeds from operation 612 to operation 614, where it ends.

Figure 7:
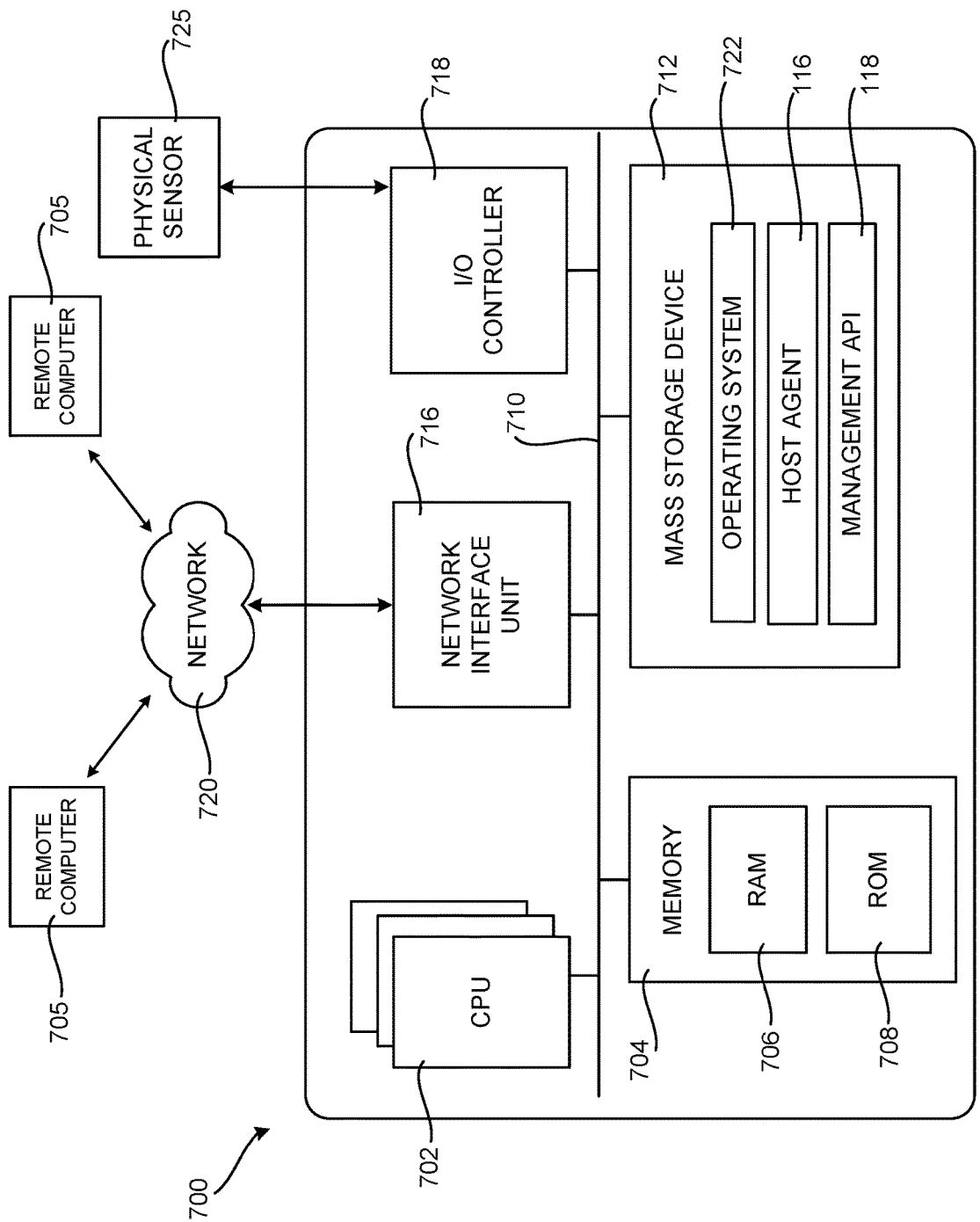
FIG. 7 is a computer architecture diagram showing an illustrative computer hardware and software architecture for a computing device that can act as a host for a MFND that implements aspects of the technologies presented herein.

FIG. 7 is a computer architecture diagram showing an illustrative computer hardware and software architecture for a data processing system 700 that can act as a host 100 for a MFND 102 that implements aspects of the technologies presented herein. In particular, the architecture illustrated in FIG. 7 can be utilized to implement a server computer, mobile phone, an e-reader, a smartphone, a desktop computer, an AR/VR device, a tablet computer, a laptop computer, or another type of computing device that acts as a host 100 for the MFND 102.

The data processing system 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the data processing system 700, such as during startup, can be stored in the ROM 708. The data processing system 700 further includes a mass storage device 712 for storing an operating system 722, application programs, and other types of programs. For example, the mass storage device 712 might store the host agent 116 and the management API 118. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the data processing system 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the data processing system 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the data processing system 700. For purposes of the claims, the phrase "computer storage medium," and variations thereof, does not include waves or signals per se or communication media.

According to various configurations, the data processing system 700 can operate in a networked environment using logical connections to remote computers through a network such as the network 720. The data processing system 700 can connect to the network 720 through a network interface unit 716 connected to the bus 710. It should be appreciated that the network interface unit 716 can also be utilized to connect to other types of networks and remote computer systems. The data processing system 700 can also include an input/output controller 718 for receiving and processing input from a number of other devices, including a keyboard, mouse, touch input, an electronic stylus (not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall data processing system 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the data processing system 700 in order to store and execute the software components presented herein. It also should be appreciated that the architecture shown in FIG. 7 for the data processing system 700, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the data processing system 700 might not include all of the components shown in FIG. 7, can include other components that are not explicitly shown in FIG. 7, or can utilize an architecture completely different than that shown in FIG. 7.

Figure 8:
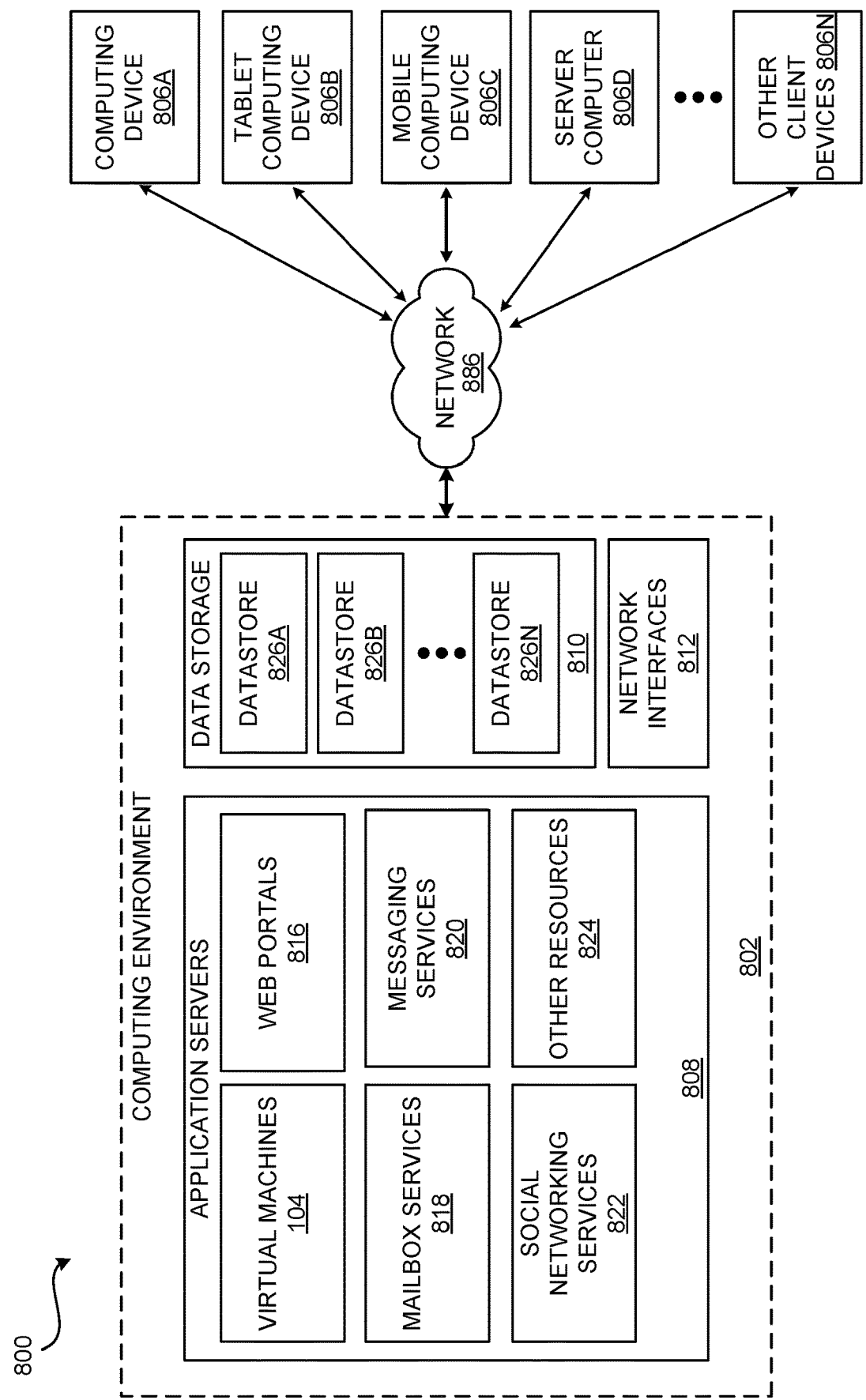
FIG. 8 is a computing network architecture diagram showing an illustrative configuration for a computing environment in which computing devices hosting MFNDs implementing the disclosed technologies can be utilized.

FIG. 8 is a computing network architecture diagram showing an illustrative configuration for a distributed computing environment 800 in which computing devices hosting MFNDs 102 implementing the disclosed technologies can be utilized. According to various implementations, the distributed computing environment 800 includes a computing environment 802 operating on, in communication with a network 856. One or more client devices 806A-806N (hereinafter referred to collectively and/or generically as "clients 806") can communicate with the computing environment 802 via the network 804 and/or other connections (not illustrated in FIG. 8).

In one illustrated configuration, the clients 806 include a computing device 806A such as a laptop computer, a desktop computer, or other computing device; a tablet computing device ("tablet computing device") 806B; a mobile computing device 806C such as a smartphone, an on-board computer, or other mobile computing device; or a server computer 806D. It should be understood that any number of devices 806 can communicate with the computing environment 802. An example computing architecture for the devices 806 is illustrated and described above with reference to FIG. 7. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, VMs, portals, and/or other resources. The application servers 808 can also be implemented using host computing devices 100 that includes MFNDs 102 configured in the manner described herein.

In the illustrated configuration, the application servers 808 host one or more virtual machines 104 for hosting applications, network services, or for providing other functionality. It should be understood that this configuration is illustrative only and should not be construed as being limiting in any way. The application servers 808 can also host or provide access to one or more portals, link pages, web sites, network services, and/or other information sites, such as web portals 816.

According to various implementations, the application servers 808 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging services, chat services, forum services, and/or other communication services.

The application servers 808 also might include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. Other services are possible and are contemplated.

The social networking services 822 also can include commenting, blogging, and/or micro blogging services. Other services are possible and are contemplated. As shown in FIG. 8, the application servers 808 also can host other network services, applications, portals, and/or other resources ("other resources") 824. The other resources 824 can include, but are not limited to, document sharing, rendering, or any other functionality.

As mentioned above, the computing environment 802 can include data storage 810. According to various implementations, the functionality of the data storage 810 is provided by one or more databases operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826").

The datastores 826 are configured to host data used or created by the application servers 808 and/or other data. Although not illustrated in FIG. 8, the datastores 826 also can host or store web page documents, word processing documents, presentation documents, data structures, and/or other data utilized by any application program or another module. Aspects of the datastores 826 might be associated with a service for storing files.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also might be utilized to connect to other types of networks and/or computer systems.

It should be understood that the distributed computing environment 800 described herein can implement aspects of at least some of the software elements described herein with any number of virtual computing resources and/or other distributed computing functionality that can be configured to execute any aspects of the software components disclosed herein.

It should be further understood that the disclosure presented herein also encompasses the subject matter set forth in the following clauses:

Clause 1. A computer-implemented method, comprising: creating a child physical function on a multiple physical function non-volatile memory device (MFND); configuring the child physical function on the MFND to provide a specified Quality of Service (QoS) level; collecting child physical function QoS statistics for the child physical function; and providing the child physical function QoS statistics from the MFND to a host computing device.

Clause 2. The computer-implemented method of clause 1, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during a monitoring period.

Clause 3. The computer-implemented method of any of clauses 1 or 2, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during a monitoring period.

Clause 4. The computer-implemented method of any of clauses 1-3, wherein the child physical function QoS statistics for the child physical function specify a percentage of read operations and write operations performed by the child physical function during a monitoring period.

Clause 5. The computer-implemented method of any of clauses 1-4, wherein the child physical function QoS statistics for the child physical function specify a size of input/output (I/O) workloads performed by the child physical function during a monitoring period.

Clause 6. The computer-implemented method of any of clauses 1-5, wherein the MFND comprises a non-volatile memory device, and wherein the QoS statistics for the child physical function specify an amount of the non-volatile memory device utilized.

Clause 7. The computer-implemented method of any of clauses 1-6, wherein the host computing device specifies a QoS statistics monitor period and a QoS statistics swap bucket period to the MFND, and wherein the method further comprises: storing the child physical function QoS statistics in an active log during the QoS statistics monitor period; and swapping the active log with a save log when the QoS statistics swap bucket period elapses, wherein the child physical function QoS statistics are provided from the MFND to the host computing device from the save log.

Clause 8. The computer-implemented method of any of clauses 1-7, further comprising generating an asynchronous event from the MFND to the host computing device when the QoS statistics swap bucket period elapses.

Clause 9. A multiple physical function non-volatile memory device (MFND), comprising: a non-volatile memory device; a parent physical function; and a child physical function configured to provide a Quality of Service (QoS) level specified by a host computing device configured to perform read or write operations on the non-volatile memory device, wherein the MFND is configured to collect child physical function QoS statistics for the child physical function, and provide the child physical function QoS statistics to the host computing device.

Clause 10. The MFND of clause 9, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during a monitoring period.

Clause 11. The MFND of any of clauses 9 or 10, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during a monitoring period.

Clause 12. The MFND of any of clauses 9-11, wherein the child physical function QoS statistics for the child physical function specify a percentage of read operations and write operations performed by the child physical function during a monitoring period.

Clause 13. The MFND of any of clauses 9-12, wherein the child physical function QoS statistics for the child physical function specify a size of input/output (I/O) workloads performed by the child physical function during a monitoring period.

Clause 14. The MFND of any of clauses 9-13, wherein the QoS statistics for the child physical function specify an amount of the non-volatile memory device utilized.

Clause 15. The MFND of any of clauses 9-14, wherein the host computing device specifies a QoS statistics monitor period and a QoS statistics swap bucket period to the MFND, and wherein the MFND is further configured to: store the child physical function QoS statistics in an active log during the QoS statistics monitor period; swap the active log with a save log when the QoS statistics swap bucket period elapses; and generate an asynchronous event from the MFND to the host computing device when the QoS statistics swap bucket period elapses, wherein the child physical function QoS statistics are provided from the MFND to the host computing device from the save log.

Clause 16. A non-transitory computer-readable storage medium having computer-executable instructions stored thereupon which, when executed by one or more processors, cause the one or more processors to: create a child physical function on a multiple physical function non-volatile memory device (MFND); configure the child physical function on the MFND to provide a specified Quality of Service (QoS) level; collect child physical function QoS statistics for the child physical function; and provide the child physical function QoS statistics from the MFND to a host computing device.

Clause 17. The non-transitory computer-readable storage medium of clause 16, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during a monitoring period.

Clause 18. The non-transitory computer-readable storage medium of any of clauses 16 or 17, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during a monitoring period.

Clause 19. The non-transitory computer-readable storage medium of any of clauses 16-19, wherein the child physical function QoS statistics comprise statistics selected from the group consisting of a percentage of read operations and write operations performed by the child physical function during a monitoring period, a size of input/output (I/O) workloads performed by the child physical function during a monitoring period, and an amount of the non-volatile memory device utilized.

Clause 20. The non-transitory computer-readable storage medium of any of clauses 16-20, wherein the host computing device specifies a QoS statistics monitor period and a QoS statistics swap bucket period to the MFND, and wherein the non-transitory computer-readable storage medium has further computer-executable instructions stored thereupon to: store the child physical function QoS statistics in an active log during the QoS statistics monitor period; swap the active log with a save log when the QoS statistics swap bucket period elapses; and generate an asynchronous event from the MFND to the host computing device when the QoS statistics swap bucket period elapses, wherein the child physical function QoS statistics are provided from the MFND to the host computing device from the save log.

Although the technologies presented herein have been described in language specific to structural features and/or methodological acts, it is to be understood that the appended claims are not necessarily limited to the features or acts described. Rather, the features and acts are described as example implementations of such technologies. Moreover, the above-described subject matter may be implemented as a computer-controlled apparatus, a computer process, a computing system, or as an article of manufacture such as a computer-readable storage medium.

The operations of the example methods presented herein are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more instances of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
creating a child physical function on a multiple physical function non-volatile memory device;
configuring the child physical function on the multiple physical function non-volatile memory device to provide a specified Quality of Service (QoS) level;
collecting, during a monitoring period defined by a host computing device, child physical function QoS statistics for the child physical function;
storing, during the monitoring period, the child physical function QoS statistics for the child physical function in an active log entry of an active log;
determining that a swap period defined by the host computing device has elapsed, wherein the swap period is greater than the monitoring period;
in response to determining that the swap period has elapsed, swapping the active log with a save log; and providing, via the save log, the child physical function QoS statistics from the multiple physical function non-volatile memory device to the host computing device.

2. The computer-implemented method of claim 1, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during the monitoring period.

3. The computer-implemented method of claim 1, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during the monitoring period.

4. The computer-implemented method of claim 1, wherein the child physical function QoS statistics for the child physical function specify a percentage of read operations and write operations performed by the child physical function during the monitoring period.

5. The computer-implemented method of claim 1, wherein the child physical function QoS statistics for the child physical function specify a size of input/output (I/O) workloads performed by the child physical function during the monitoring period.

6. The computer-implemented method of claim 1, wherein the multiple physical function non-volatile memory device comprises a non-volatile memory device, and wherein the QoS statistics for the child physical function specify an amount of the non-volatile memory device utilized.

7. The computer-implemented method of claim 1, further comprising generating an asynchronous event from the multiple physical function non-volatile memory device to the host computing device when the swap period elapses.

8. A multiple physical function non-volatile memory device, comprising:
   a non-volatile memory device;
   a parent physical function; and
   a child physical function configured to provide a Quality of Service (QoS) level specified by a host computing device configured to perform read or write operations on the non-volatile memory device, wherein the multiple physical function non-volatile memory device is configured to:
      collect, during a monitoring period defined by the host computing device, child physical function QoS statistics for the child physical function;
      store, during the monitoring period, the child physical function QoS statistics for the child physical function in an active log entry of an active log;
      determine that a swap period defined by the host computing device has elapsed, wherein the swap period is greater than the monitoring period;
      in response to determining that the swap period has elapsed, swap the active log with a save log; and
      provide, via the save log, the child physical function QoS statistics to the host computing device.

9. The multiple physical function non-volatile memory device of claim 8, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during the monitoring period.

10. The multiple physical function non-volatile memory device of claim 8, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during the monitoring period.

11. The multiple physical function non-volatile memory device of claim 8, wherein the child physical function QoS statistics for the child physical function specify a percentage of read operations and write operations performed by the child physical function during the monitoring period.

12. The multiple physical function non-volatile memory device of claim 8, wherein the child physical function QoS statistics for the child physical function specify a size of input/output (I/O) workloads performed by the child physical function during the monitoring period.

13. The multiple physical function non-volatile memory device of claim 8, wherein the QoS statistics for the child physical function specify an amount of the non-volatile memory device utilized.

14. The multiple physical function non-volatile memory device of claim 8, wherein the multiple physical function non-volatile memory device is further configured to generate an asynchronous event from the multiple physical function non-volatile memory device to the host computing device when the swap period elapses.

15. A non-transitory computer-readable storage medium having computer-executable instructions stored thereupon which, when executed by one or more processors, cause the one or more processors to:
   create a child physical function on a multiple physical function non-volatile memory device;
   configure the child physical function on the multiple physical function non-volatile memory device to provide a specified Quality of Service (QoS) level;
   collect, during a monitoring period defined by a host computing device, child physical function QoS statistics for the child physical function;
   store, during the monitoring period, the child physical function QoS statistics for the child physical function in an active log entry of an active log;
   determine that a swap period defined by the host computing device has elapsed, wherein the swap period is greater than the monitoring period;
   in response to determining that the swap period has elapsed, swap the active log with a save log; and
   provide, via the save log, the child physical function QoS statistics from the multiple physical function non-volatile memory device to the host computing device.

16. The non-transitory computer-readable storage medium of claim 15, wherein the specified QoS level defines maximum read input/output operations per second (IOPS) and maximum write IOPS for the child physical function, and wherein the child physical function QoS statistics for the child physical function specify a percentage of the maximum read IOPS and the maximum write IOPS provided by the child physical function during the monitoring period.

17. The non-transitory computer-readable storage medium of claim 15, wherein the specified QoS level defines a maximum read bandwidth and a maximum write bandwidth for the child physical function, and wherein the child physical function QoS statistics for the child physical function specify a percentage of the maximum read bandwidth and the maximum write bandwidth provided by the child physical function during the monitoring period.

18. The non-transitory computer-readable storage medium of claim 15, wherein the child physical function QoS statistics comprise statistics selected from a group consisting of a percentage of read operations and write operations performed by the child physical function during the monitoring period, a size of input/output (I/O) workloads performed by the child physical function during the monitoring period, and an amount of a non-volatile memory device utilized.

19. The non-transitory computer-readable storage medium of claim 15, wherein the non-transitory computer-readable storage medium has further computer-executable instructions stored thereupon to generate an asynchronous event from the multiple physical function non-volatile memory device to the host computing device when the swap period elapses.

* * * * *